(12) United States Patent
Yaeger

(10) Patent No.: US 10,710,624 B1
(45) Date of Patent: Jul. 14, 2020

(54) WHEELED VEHICLE LIGHT SYSTEM

(71) Applicant: GOSAFE TECH LLC, Mount Vernon, WA (US)

(72) Inventor: Paul Yaeger, Mount Vernon, WA (US)

(73) Assignee: GoSafe Tech LLC, Mt. Vernon, WA (US)

( * ) Notice: Subject to any disclaimer, the term of this patent is extended or adjusted under 35 U.S.C. 154(b) by 0 days.

(21) Appl. No.: 16/396,667

(22) Filed: Apr. 27, 2019

(51) Int. Cl.
| | |
|---|---|
| *B62B 9/00* | (2006.01) |
| *F21V 23/04* | (2006.01) |
| *F21V 23/02* | (2006.01) |
| *F21V 23/00* | (2015.01) |
| *B62B 7/04* | (2006.01) |
| *F21Y 115/10* | (2016.01) |
| *F21Y 113/13* | (2016.01) |

(52) U.S. Cl.
CPC ............ *B62B 9/005* (2013.01); *F21V 23/001* (2013.01); *F21V 23/02* (2013.01); *F21V 23/04* (2013.01); *B62B 7/044* (2013.01); *F21Y 2113/13* (2016.08); *F21Y 2115/10* (2016.08)

(58) Field of Classification Search
CPC ..................................................... B62B 9/005
See application file for complete search history.

(56) References Cited

U.S. PATENT DOCUMENTS

| | | | | |
|---|---|---|---|---|
| 5,938,216 A * | 8/1999 | Weng | ........................ | B62B 9/26 280/47.38 |
| 6,394,633 B1 * | 5/2002 | Perez | ........................ | B62B 9/00 280/38 |
| 8,356,824 B1 * | 1/2013 | Manweiler | .............. | B62B 9/005 280/33.992 |
| 8,899,799 B1 * | 12/2014 | Fairhurst | ................. | B62B 9/005 362/459 |
| 2012/0155097 A1 * | 6/2012 | Gross | ................... | B60Q 1/2696 362/459 |
| 2012/0300439 A1 * | 11/2012 | Hatfield | .................. | B62B 9/005 362/183 |
| 2014/0226358 A1 * | 8/2014 | Nielson | ................... | B62B 9/005 362/543 |
| 2015/0144411 A1 * | 5/2015 | Washington | .......... | B62B 5/0076 180/167 |
| 2016/0009219 A1 * | 1/2016 | Gilbert | .................... | B62B 9/005 280/47.38 |
| 2018/0003350 A1 * | 1/2018 | Spriggins | ............. | A61G 15/002 |

OTHER PUBLICATIONS

Website of Third Kind Lights, and links. Available at https://thirdkindlights.com/, as viewed on Apr. 25, 2019.

* cited by examiner

*Primary Examiner* — Alexander K Garlen

(74) *Attorney, Agent, or Firm* — Repetto Law, P.C.; Bryan E. Repetto

(57) ABSTRACT

Disclosed is a light system. In certain disclosed embodiments, the light system is disposed on a stroller, but the system can be disposed on any object. The system comprises one or more LED lights, one or more battery packs, cables connecting the battery backs to the LED lights. Certain embodiments also comprise a stroller, having an upper storage area, a lower storage area, and LED lights disposed on the front and rear of the frame of the stroller.

9 Claims, 10 Drawing Sheets

WHEELED VEHICLE LIGHT SYSTEM

BACKGROUND

Strollers, and other wheeled products on the market today, are commonly used. Although such products typically include numerous safety features, lighting systems are often lacking. Having adequate light can enhance safety and enable users to exercise or walk at night with a stroller or other wheeled device.

Another challenge presented to lighting systems for strollers is the cost and technical difficult associated with the installation of a light system.

The disclosed system can be disposed on a stroller with minimal cost, time, and effort. Certain embodiments allow for components to be easily installed, such as a front LED light. A front LED light may be installed onto a stroller with an adhesive backing or with plastic ties (commonly known as "zip ties"). Cables for the system are designed to be easily secured with plastic ties as well. Cables and battery packs of the disclosed system are designed to be water resistant to allow for use in all weather conditions.

BRIEF SUMMARY

Disclosed is a light system for a stroller, or similar device. The system is designed to be easy and inexpensive to install, while providing enhanced safety.

Certain embodiments comprise a front, white LED light, controlled by a switch in a battery pack. The battery pack may be stored near the handle of the stroller in an upper storage area to allow users easy access to the switch. Certain embodiments also comprise rear lights, typically red in color.

Water resistant cables in the system are secured to the frame of the stroller using plastic ties. Plastic ties are used to facilitate easy installation.

Certain embodiments also comprise additional battery packs for additional power or longer operating times. The battery packs may also comprise USB ports to enable users to charge electronic devices such as smartphones or tablets.

FIGURES

DETAILED DESCRIPTION

Disclosed is a light system. The figures, and discussion herein, discloses a light system disposed on a stroller, but the light system can be disclosed on any wheeled device such as a bicycle, a motorcycle, wagon, shopping cart, or forklift, or it may be disposed upon any device which would be capable of holding the components. Various embodiments of the light system are self-contained, and are powered by a self-contained battery. Lights described herein, are described as LED (light emitting diode) lights, but any kind of light, including incandescent or fluorescent, may be substituted in various embodiments.

Figure 1:
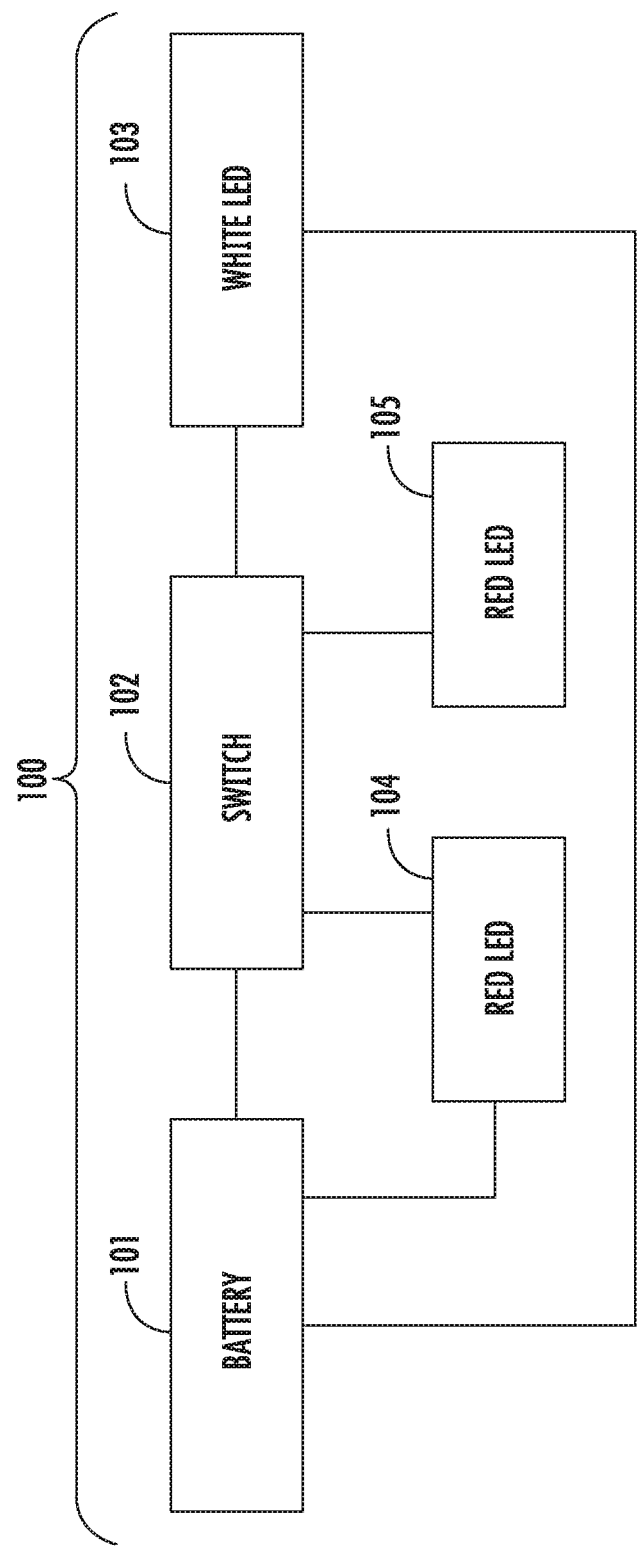
FIG. 1 illustrates a representative embodiment of a circuit diagram for a light system.

FIG. 1 illustrates an embodiment of a basic circuit diagram of the light system 100. The system comprises a battery 101. In certain embodiments, the battery is contained within a battery back. The battery pack may include a switch 102 to control the lights, or in other embodiments, the switch 102 may be disposed on other components. As depicted, the switch controls a white LED light 103, and two red LED lights 104 105, but in embodiments having more or fewer lights, the switch will control all lights on the system. In certain embodiments, the white LED 101 light is disposed on the front of a stroller, and one or more red LED lights 104 105 are disposed on the rear of the stroller. The wiring between the battery and the LED lights may be in parallel or in sequence. Certain embodiments may include any number or any combination of one or more white LED lights 103 and one or more red LED lights 104 105.

Figure 2:
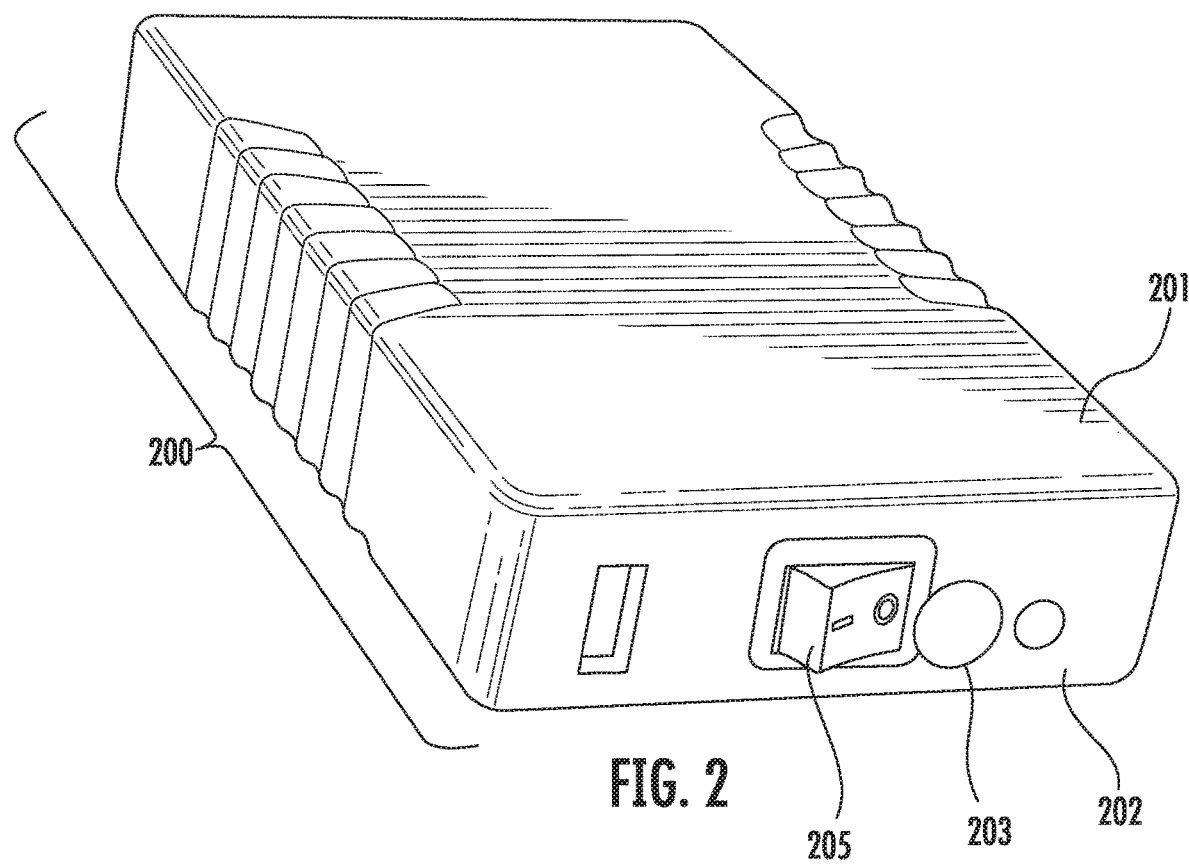
FIG. 2 illustrates a representative embodiment of a battery pack for a light system.

FIG. 2 illustrates an embodiment of a battery pack 200. The battery pack 201 contains the battery that powers the system. Certain embodiments of the battery pack utilize 12 volt and 5 volt outputs, though other voltages may be utilized, depending on the needs or lights on the system. In place of a battery, the battery pack 200 may comprise a capacitor, or other alternative power source. Certain embodiments will have a power output of at least 10 watts and a voltage of less than 25 volts. The total needs of the system can vary, based on the number of lights on the system, and any additional use of the battery pack to charge or power other devices through one or more optional USB outlets. The battery pack 201 may be constructed to be weather resistant, using water resistant housing materials. The battery pack 201 depicted includes a switch 205. In certain embodiments, the switch 205 may be illuminated to allow for ease of use in low light conditions. In such embodiments, the illumination of the switch 205 may be deactivated, when the system lights are turned on, as to not interfere with a user's night vision. Certain embodiments also include a light 203, and an outlet 202 for a power cable. Additionally, the battery pack may comprise one or more USB outlets. The USB outlets may be used to charge other devices, power the system, charge the battery within the battery back, or deliver power to any other USB enabled device.

Figure 3:
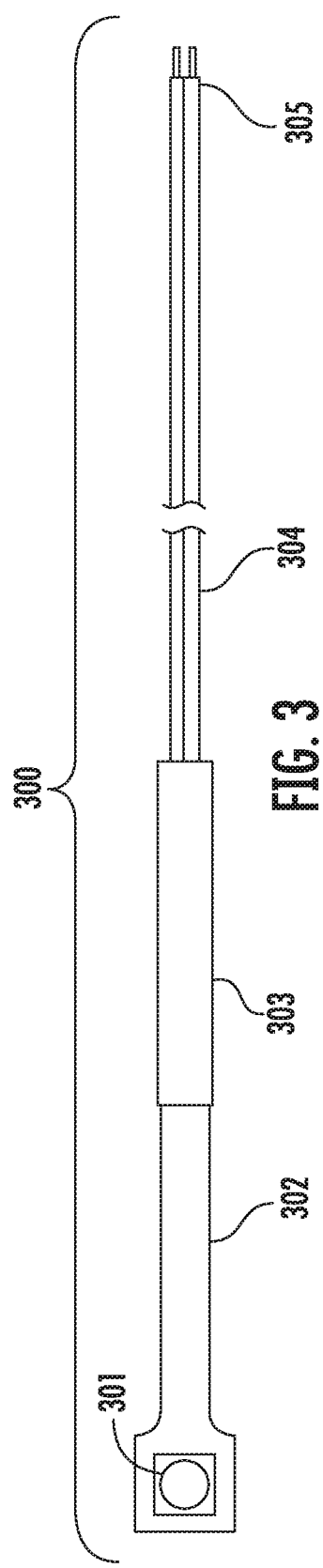
FIG. 3 illustrates a representative embodiment of configuration for wiring of a light system.

FIG. 3 illustrates an embodiment of an LED light coupled to a cable 300. The light 301 is coupled to a flexible cable 302. The shaft of the flexible cable may be covered in a nonconductive insulating material 303, which insulates one or more wires 304 305 that deliver power to the LED light. The nonconductive insulating material 303 may be water resistant, to enable use in various weather conditions.

Figure 4:
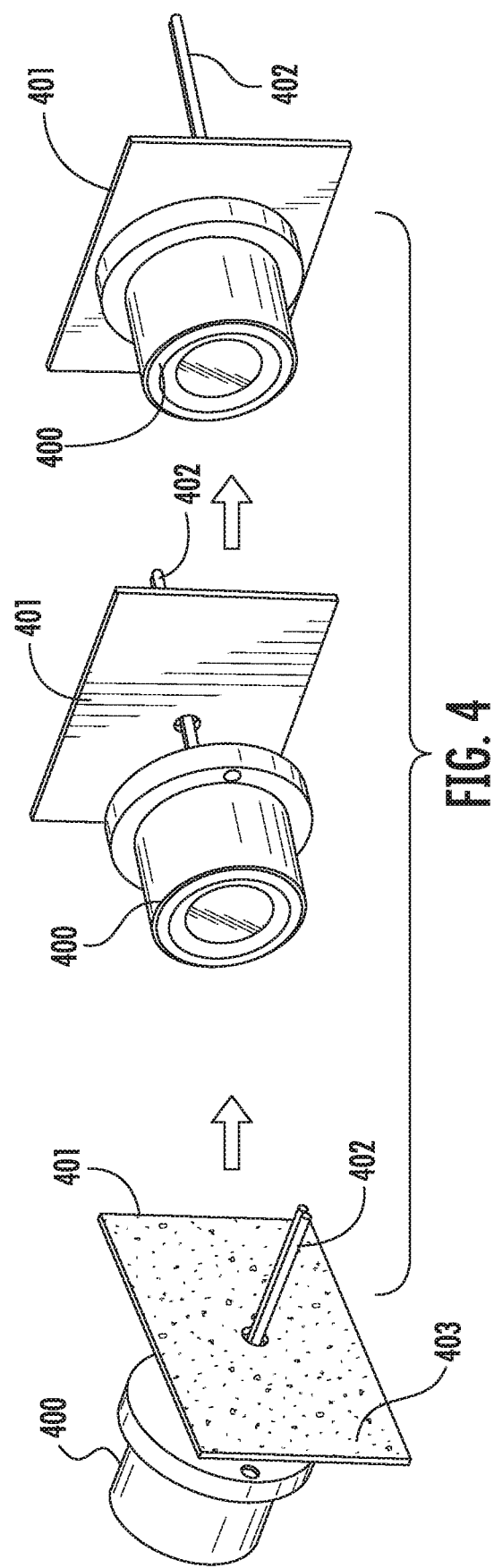
FIG. 4 illustrates a representative embodiment of mounting assembly for a light in a light system.

FIG. 4 illustrates an embodiment of an LED light 400 and a mounting assembly. The LED light 400 is secured to a mounting plate 401. The mounting plate 401 defines an opening through which one or more wires 402 pass. The mounting plate 401 may be coated with an adhesive 403 to mount the mounting assembly onto a stroller or other device. In alternative embodiments, the mounting assembly may be secured to a stroller or other device with screws, bolts, wire, zip ties, plastic ties, or any other suitable material.

Figure 5:
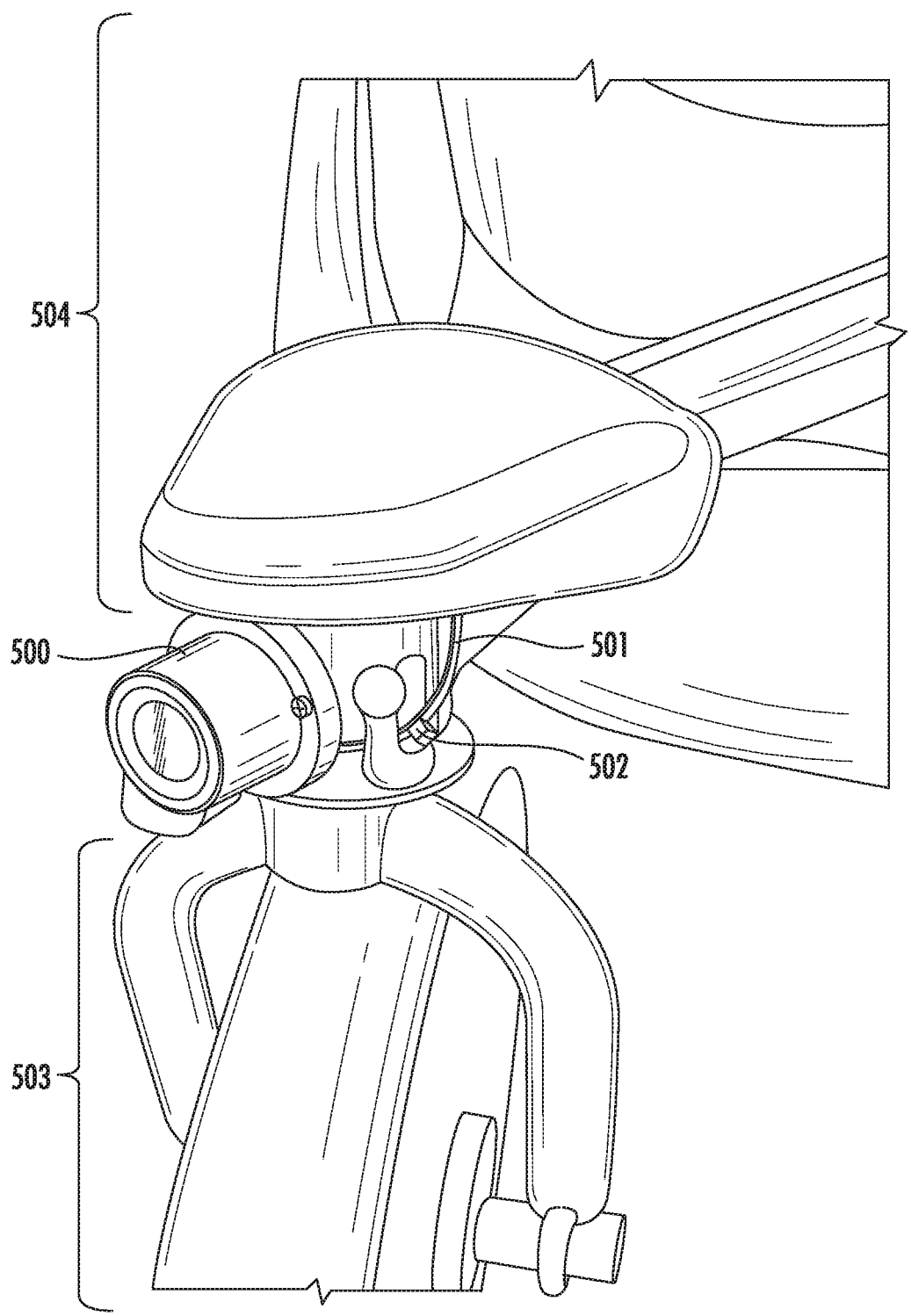
FIG. 5 illustrates a representative embodiment of a light disposed on the front a stroller.

FIG. 5 illustrates an embodiment of a stroller 504 with a front LED light 500 disposed on the front. The front LED light 500 is disposed on the front of the stroller 504 above the front wheel 503 of the stroller. The front LED light 500 power cable 501 is secured to the stroller by a plastic tie 502. In certain embodiments, the front LED light 500 would be white, but the LED light 500 may be any color. Additionally, the front LED light 500 may be positioned to illuminate space in front of the stroller or may be positioned to illuminate the space below the stroller.

Figure 6:
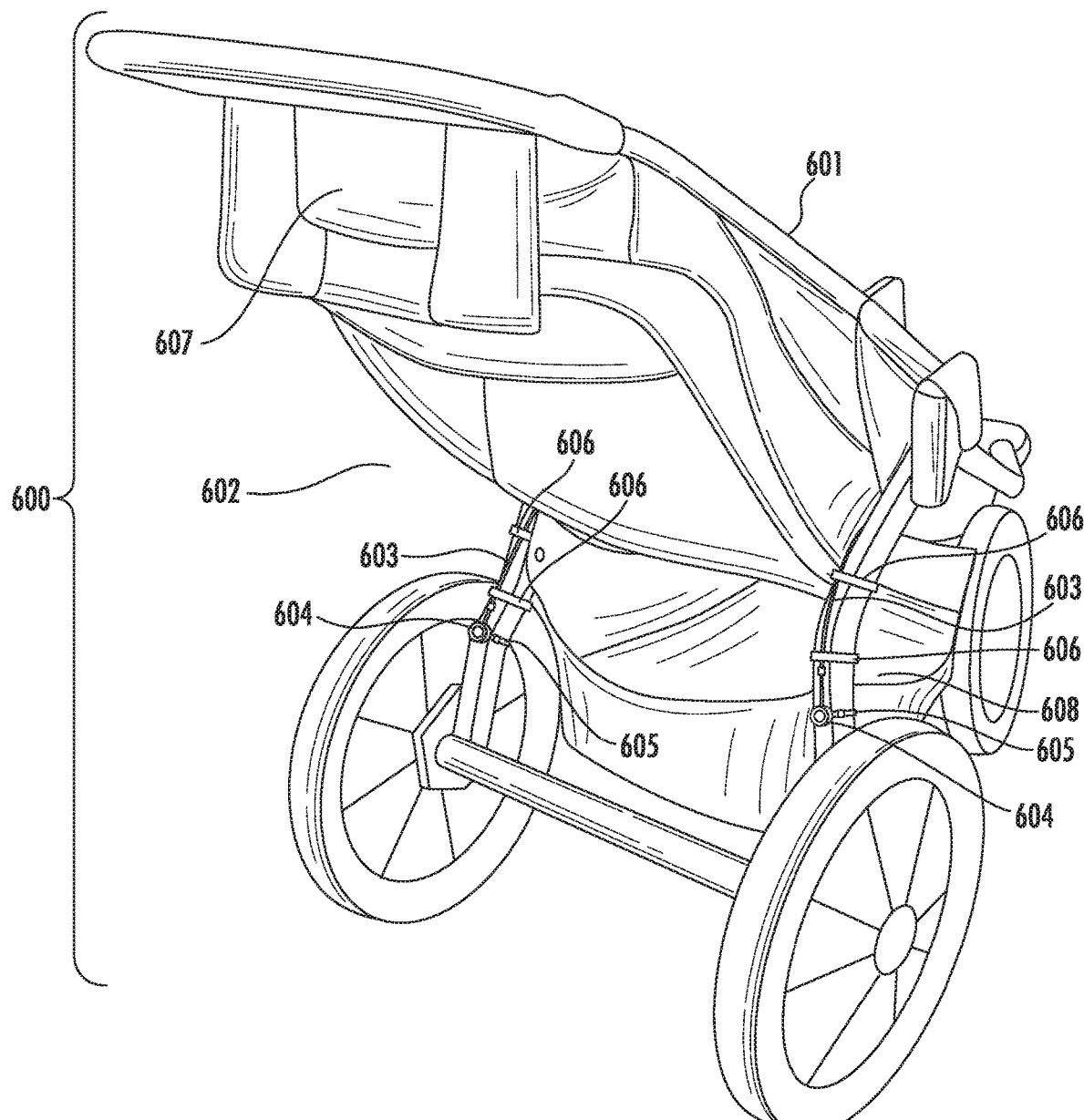
FIG. 6 illustrates a rear view a representative embodiment of a light system, disposed on a stroller.

FIG. 6 illustrates a stroller 600 when viewed from the rear 602. The stroller includes a storage space for the battery pack 607 near handle to allow for easy access for a user. Two rear LED lights 604 are depicted; one left rear LED light and one right rear LED light. Each rear LED light is coupled to a power cable 603. Plastic ties 606 secure the power cable 603 to the frame of the stroller 600. Additional plastic ties 605 secure the rear LED lights in place. Although two rear LED lights 604 on each side of the stroller, certain embodiments may include any number of rear LED lights 604. Depending on the size of the stroller, any number of plastic ties 606 may be used to secure the power cables 603 to the frame. In certain embodiments, the rear LED lights 604 disposed on the rear of a stroller 600 are red, but they may be any color.

Figure 7:
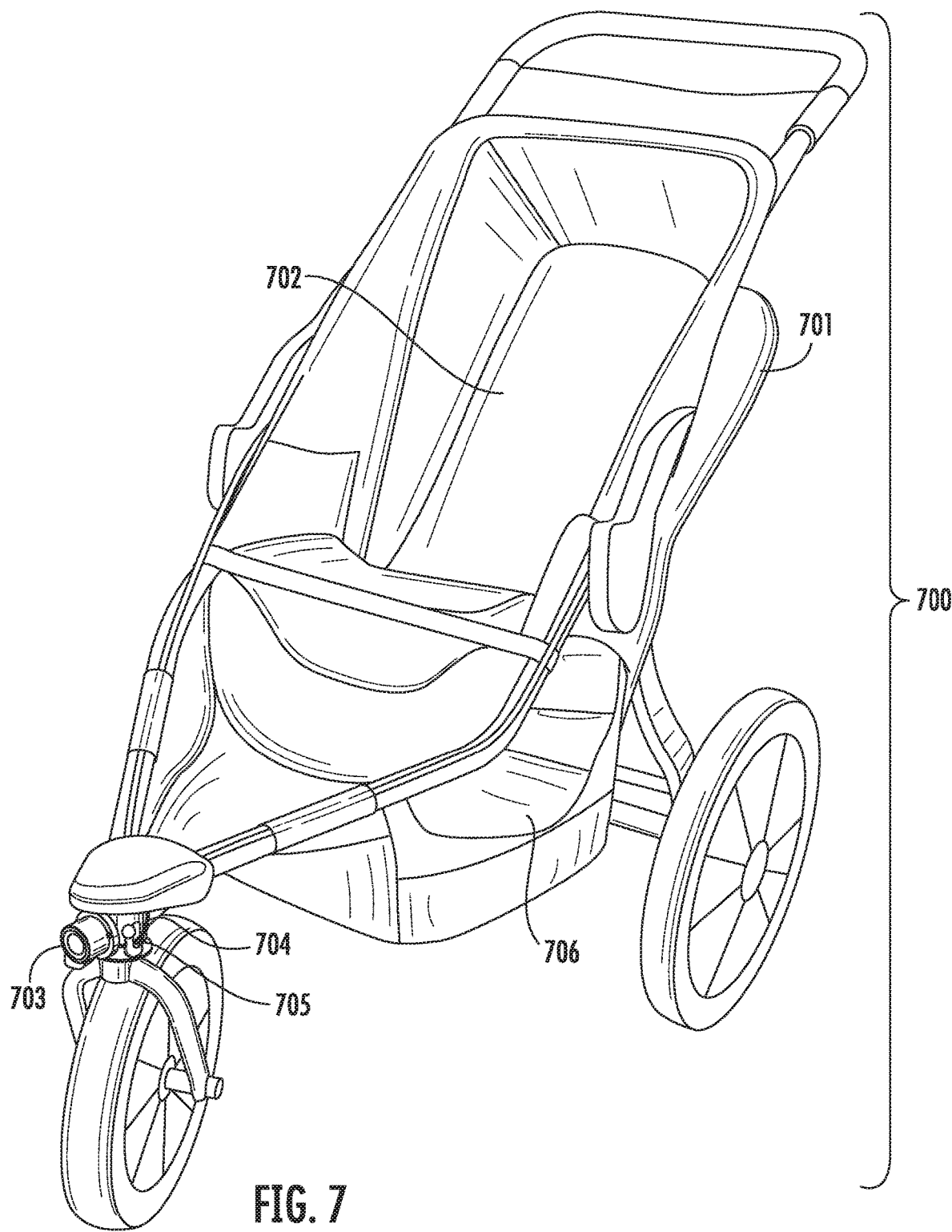
FIG. 7 illustrates a front view of a representative embodiment of a light system disposed on a stroller.

FIG. 7 illustrates a front view of an embodiment of a stroller 700 with a front LED light 703 disposed above its front wheel. A power cable 704 extends to the front LED light 703. The power cable 704 is secured in place with a plastic tie 705. A lower storage area 706 is present. In certain embodiments, the lower storage area 706 may be used to store the battery pack or may store a secondary battery pack. When viewed from the front 702 of the stroller 700, the front LED light 703 will illuminate the area in front of the stroller.

Figure 8:
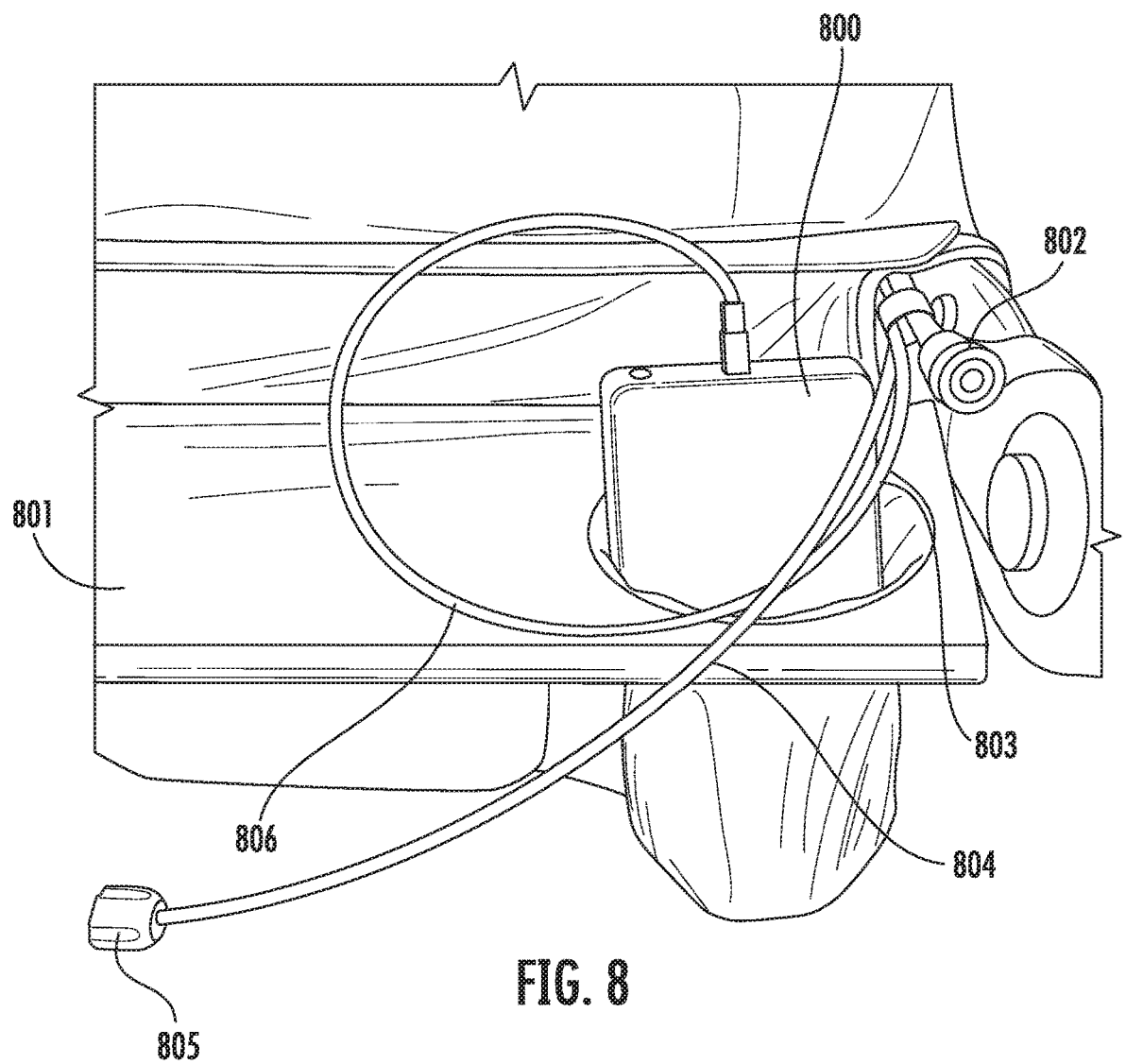
FIG. 8 illustrates a representative embodiment of an upper storage space disposed on a stroller, with an electronic device charging.

FIG. 8 illustrates an embodiment of an upper storage space 803. The upper storage space 803 is disposed on the rear of the stroller 801 the handle. In certain embodiments, the upper storage space is adjacent to the handle. A first rear facing LED light 802 is disposed near the upper storage space 803 to allow a user to see in low light conditions and illuminate the upper storage space 803. In certain embodiments, a cable to charge other devices may be present. As illustrated, a smartphone 800 is being charged. A power cable 804 extends to a second rear facing LED light 805 which may be secured to another location on the stroller.

Figure 9:
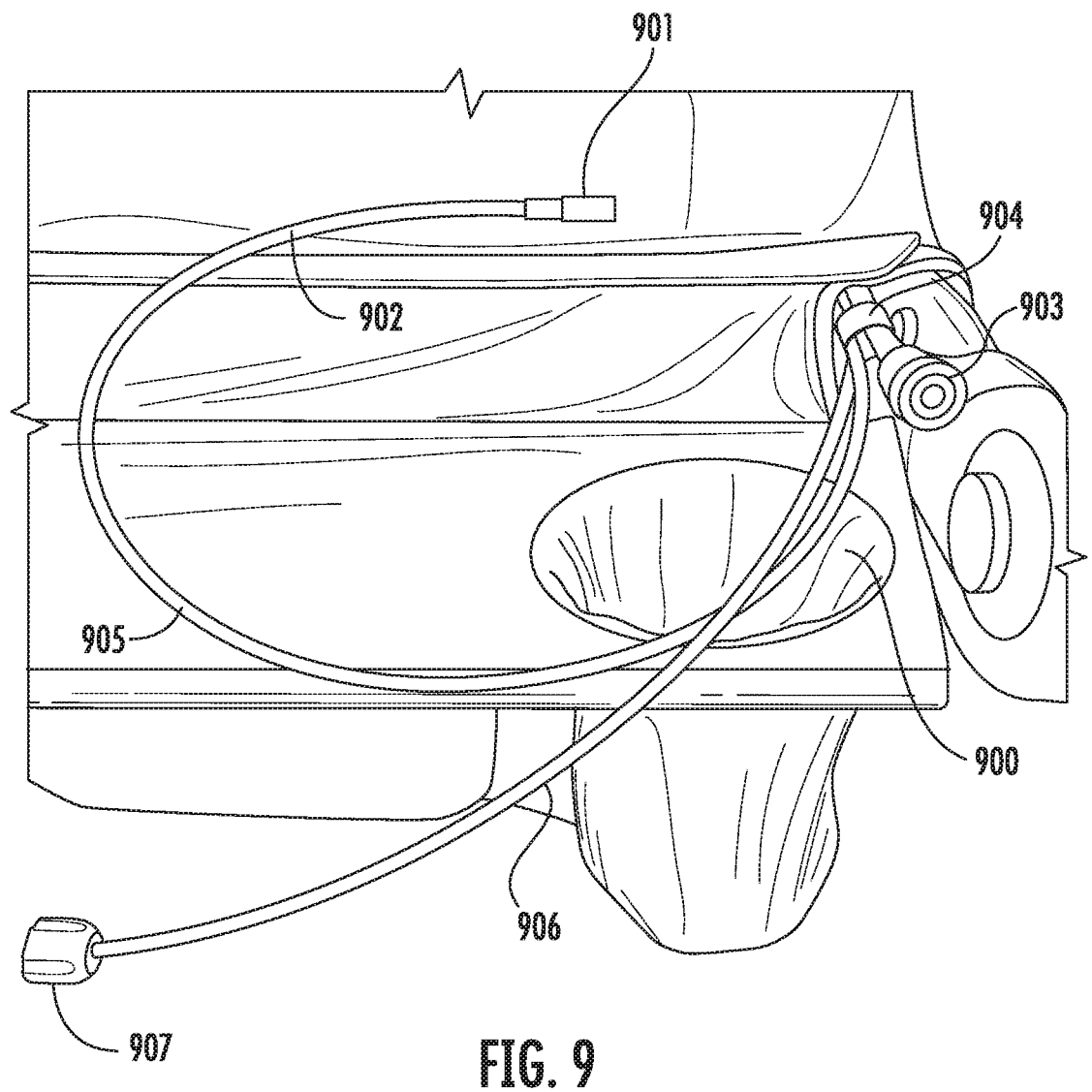
FIG. 9 illustrates a representative embodiment of an upper storage space disposed on a stroller.

FIG. 9 illustrates another view of the upper storage space 900. As depicted, a first rear facing LED light is present to illuminate the area around the upper storage space. A charging cable 905 is present and may be used to charge smart phones or other electronic devices. A power cable 906 delivers current to a second rear facing LED light 907. The cables depicted are secured by a plastic tie 904.

Figure 10:
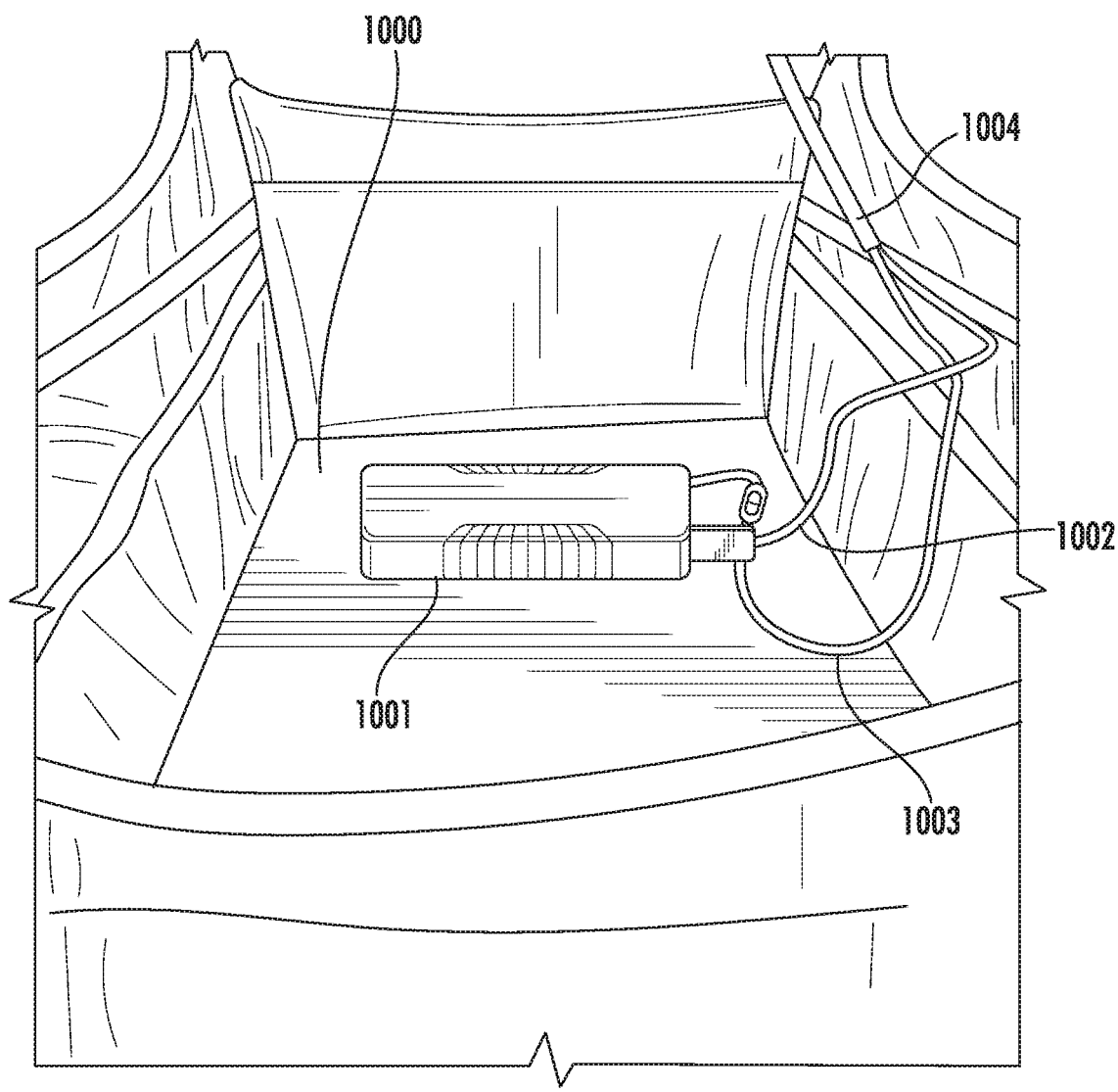
FIG. 10 illustrates a representative embodiment of a lower storage space for a battery pack, for a light system, on a stroller.
Figure 11:
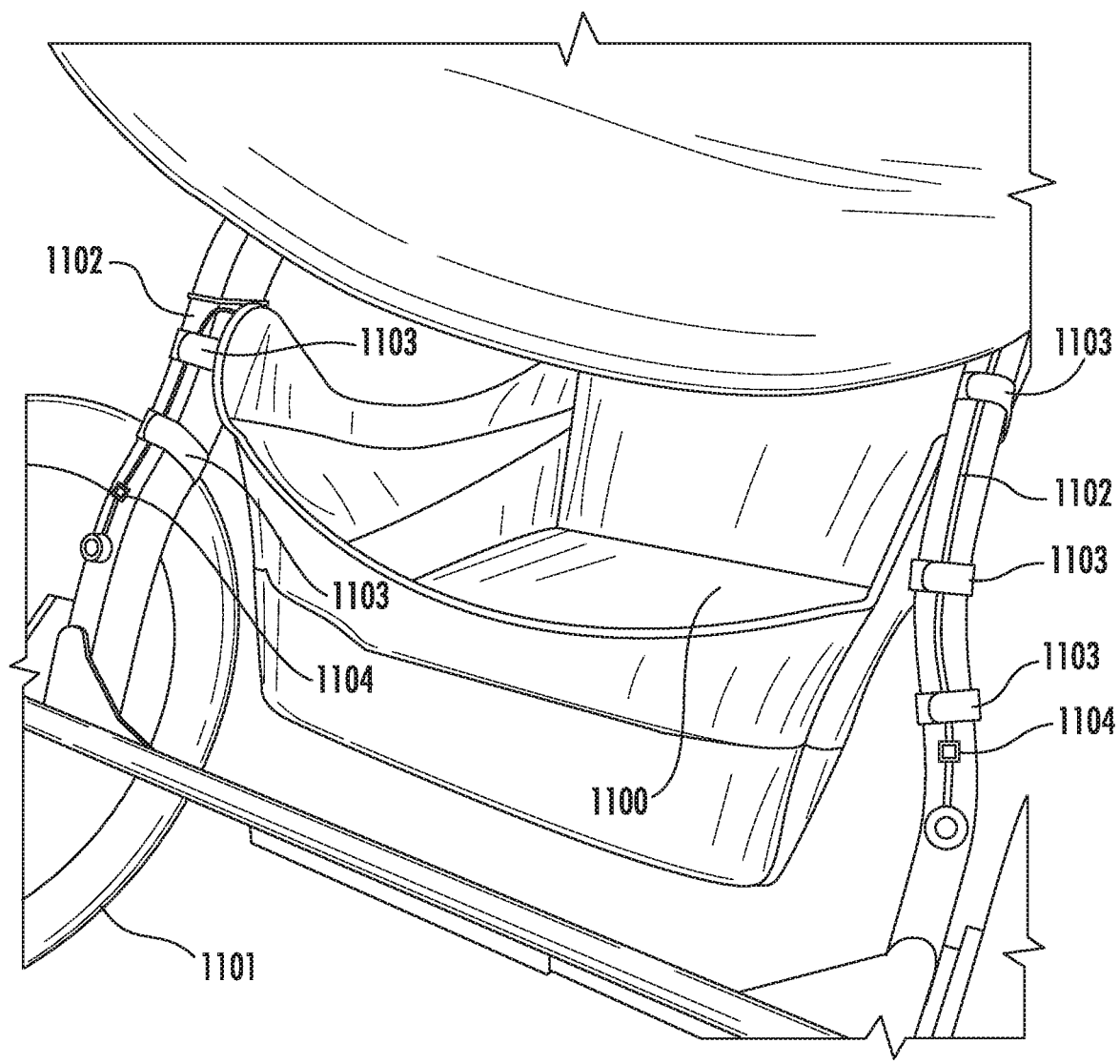
FIG. 11 illustrates a representative embodiment of a light system, disposed on a stroller, when viewed from the rear.

FIG. 10 illustrates an embodiment of a lower storage area 1000. The lower storage area is disposed below the seating area of the stroller. A lower battery pack 1001 is illustrated. While this lower battery pack may be the primary power supply, certain embodiments include two or more battery packs to supply additional power to the system. A first power cable 1002 and a second power cable 1003 are depicted. The first power cable 1002 and the second power cable 1003 may couple the depicted battery pack with an upper battery pack, or multiple other battery packs, or one or more lights. The other components coupled to the lower battery pack 1001 may be coupled in sequence or in parallel. Additional power cable may be present depending on the number of lights, and power demands of the system. The power cables are encased in a nonconductive cover 1004, FIG. 11 illustrates an embodiment of a configuration of a rear of a stroller. A lower storage space 1100 is present. Two rear LED lights 1104 are present above the wheels 1101 of the stroller. Power cables 1102 are secured to the frame of the stroller with a plurality plastic ties 1103.

While the invention has been described and illustrated with reference to certain particular embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. A light system of comprising:
    a stroller comprising:
        one or more front wheels;
        a seating area;
        a frame having, a front side and a rear side, and the rear side comprising a left rear side and a right rear side;
        a handle, disposed on the rear side of the frame; and
        an upper storage space, wherein the upper storage space is disposed on the rear of the stroller, adjacent to the handle;
    a first battery pack, stored in the upper storage space, wherein the first battery pack comprises:
        one or more batteries;
        one ore more outlets for a power cable; and
        a switch;
    a first LED light, disposed on a mounting assembly, and disposed on the front side of the frame of the stroller above the one or more front wheels of the stroller;
    a first power cable between the first battery pack and the first LED light, wherein the first power cable is secured to the frame of the stroller with a plurality of plastic ties;
    a second LED light, wherein the second LED light is disposed on the left rear side of the frame of the stroller;
    a second power cable, wherein the second power cable connects the second LED light with the first battery pack, and wherein the second power cable is secured to the frame of the stroller with a plurality of plastic ties;
    a third LED light, wherein the third LED light is disposed on the right rear side of the frame of the stroller;
    a third power cable, wherein the third power cable connects the third LED light with the first battery pack, and wherein the third power cable is secured to the frame of the stroller with a plurality of plastic ties;
    a fourth LED light, wherein the fourth LED light is disposed near to and positioned to illuminate the upper storage space; and
    a fourth power cable connecting the fourth LED light with the first battery pack.

2. The light system of claim 1, wherein the mounting assembly of the first LED light is secured to the front side of the frame of the stroller with adhesive or plastic ties.

3. The light system of claim 2, wherein the switch is illuminated.

4. The light system of claim 3, wherein the first LED light and the fourth LED light emit white light.

5. The light system of claim 4, wherein the second LED light and the third LED light emit red light.

6. The light system of claim 5, further comprising:
   a second battery pack; and
   a fifth power cable connecting the second battery pack to the first battery pack.

7. The light system of claim 6, wherein the second battery pack is stored in a glower storage area.

8. The light system of claim 7, wherein the power output of the system is at least 10 watts and the voltage is less than 25 volts.

9. The light system of claim 7, wherein the lower storage area is beneath the seating area of the stroller and is defined by a lower surface and two or more lateral walls.

* * * * *